United States Patent

Narasimhalu et al.

[11] Patent Number: 6,058,383
[45] Date of Patent: May 2, 2000

[54] COMPUTATIONALLY EFFICIENT METHOD FOR TRUSTED AND DYNAMIC DIGITAL OBJECTS DISSEMINATION

[75] Inventors: Arcot Desai Narasimhalu; Huijie Deng; Weiguo Wang, all of Singapore, Singapore

[73] Assignee: Kent Ridge Digital Labs, Singapore, Singapore

[21] Appl. No.: 09/011,800
[22] PCT Filed: Jun. 26, 1997
[86] PCT No.: PCT/SG97/00029
  § 371 Date: Feb. 14, 1998
  § 102(e) Date: Feb. 14, 1998
[87] PCT Pub. No.: WO97/50036
  PCT Pub. Date: Dec. 31, 1997

[30] Foreign Application Priority Data

Jun. 27, 1996 [SG] Singapore ............................... 9610167

[51] Int. Cl.[7] ........................................ H04L 9/00
[52] U.S. Cl. .................... 705/44; 380/21; 705/39
[58] Field of Search .................. 380/21, 20, 30; 705/39, 44, 43; 235/380; 379/91.01

[56] References Cited

U.S. PATENT DOCUMENTS

| | | | |
|---|---|---|---|
| 4,903,296 | 2/1990 | Chandra et al. | 380/4 |
| 4,999,806 | 3/1991 | Chernow et al. | 395/712 |
| 5,412,718 | 5/1995 | Narasimhalu et al. | 380/4 |
| 5,499,298 | 3/1996 | Narasimhula et al. | 380/25 |

*Primary Examiner*—Chi H. Pham
*Assistant Examiner*—Emmanuel Bayard

[57] ABSTRACT

A computationally efficient method for trusted and dynamic dissemination of digital objects. Related digital objects of various types are grouped, based on their usage and functionality, by an information provider into distribution packages. Trustworthiness of objects contained in a distribution package are certified by a trusted certification authority in the form of a certificate which consists of a body and the certification authority's signature on the body based on a public-key digital signature scheme. The body further consists of the name of the information provider; name of the distribution package; and type, safety checking flag, and digest of each and every object. It is used by end users to verify the trust criteria of any individual or any subset of objects specified by the package. To verify whether a received object meets trust criteria certified by the certificate, the end user computes the digest of the object, compares it with the corresponding digest in the certificate, and examines the type and safety checking flag of the object contained in the certificate. The end user car dynamically download additional objects, check their trustworthiness without having to verify the certificate multiple times.

19 Claims, 10 Drawing Sheets

COMPUTATIONALLY EFFICIENT METHOD FOR TRUSTED AND DYNAMIC DIGITAL OBJECTS DISSEMINATION

FIELD OF THE INVENTION

The present invention relates to the field of data processing and digital communication, and in particular, to a method for trusted and dynamic dissemination of digital objects which is computationally efficient.

BACKGROUND OF THE INVENTION

Distribution of digital objects, or objects in short-whether be it text, graphics, animation, video, audio or software (such as source code or machine code) written in various programming languages—in magnetic, electronic, optical or any other medium is becoming popular. However, because such objects are in digital format, they are susceptible to third-party tampering which is difficult to detect. In many situations it is necessary for an end user to check an object received from another party, called information provider in the present invention, against certain trust criteria before accepting and using the object. Trust criteria may include authentication of date of creation, originality, integrity, type, and usage safety of the object.

Most of the current practices in digital information dissemination do not provide end users with means of reliably checking whether an object meets certain trust criteria. Popular but very dangerous ways of distributing software over Internet are downloading software files using file transfer protocol or electronic mail. Malicious attacker may modify the software or replace it with malicious software during transit. Malicious attacker may even post malicious software on a newsgroup or on a compromised machine. When the software is downloaded and run at an end user's machine, it has all the access rights entitled to the user. For example, the malicious software may be designed to read user's private files and send them to a designated network address. The malicious software may also infect the user's system if it contains a virus or network worm.

The danger of unchecked software distribution is aggregated with the advent of new programming language environments which allow for architecturally neutral code to be dynamically loaded and run on a heterogeneous network of computers such as the Internet. In such an environment, a user's machine may dynamically download executable digital objects from various information providers and execute them locally. Without proper checking on such executable digital objects, it is like opening the door and inviting crimes to one's house.

In response to this problem a method for trusted software digital object distribution has been developed, and is published in Aviel D. Rubin, "Trusted distribution of software over the Internet", pp. 47–53, Proceeding of the Symposium on Network and Distributed System Security, Feb. 16–17, 1995, San Diego. Calif. This method relies on a trusted third party, called certification authority, to certify the originality and integrity of a software object where each individual object produced by an information provider is issued a separate certificate. In this method, an author, A, of a program registers a public key, $K_{pub}$, with a trusted third party, T. T verifies the registration information by calling A on the telephone. To distribute a file, A sends a signed message using a private key, $K_{pri}$, associated with $K_{pub}$, to T containing the hash of the file, H, and other relevant information. T issues a signed certificate containing the name of the file and its hash value. When A receives the certificate, he stores it along with the file. This certificate is sent whenever a user retrieves the file. The user then uses the certificate to verify the integrity of the file.

This method suffers from the fact that each time a digital object is downloaded, the corresponding certificate must be downloaded as well and verified by the end user. Certificate verification is a computationally intensive process requiring much processing time. Not only is this method computationally costly but it introduces additional delays in code execution which may be un-acceptable in certain applications. Furthermore, this prior art scheme is restrictive in that it only provides authentication on the object's originality and integrity; no authentication on the usage safety of objects is provided.

Hence it would be highly desirable to have method for trusted distribution of digital objects which is substantially faster and computationally efficient, and which provides authentication on the object's usage safety, as well as on its originality and integrity.

OBJECT OF THE INVENTION

It is therefore, the object of the invention to overcome the shortcomings described above, and provide a method for trusted distribution of digital objects which is computationally efficient, and which provides authentication on the object's usage safety, as well as on its originality and integrity.

SUMMARY OF THE INVENTION

The present invention is a method for trusted and dynamic dissemination of digital objects. Related objects of various types are grouped, based on their usage and functionality, by an information provider into distribution packages. Trust criteria of an object include authentication of its originality, integrity, type, and optionally, usage safety. Trustworthiness of objects contained in a distribution package are certified by a trusted third party, called certification authority, in the form of a certificate. The certificate consists of a body and the certification authority's signature on the body based on a public-key digital signature scheme. The body further consists of the name of the information provider; name of the distribution package; and type, safety checking flag, and digest of each and every object. The certificate above can be made available by an information provider to end users either on line or off line. It is used by end users to verify the trust criteria of any individual or any subset of objects specified by the package.

When an end user intends to download objects in a distribution package from an information provider, the end user downloads the certificate of the package and then verifies its validity. If the certificate is verified, the end user then downloads objects specified in the package interactively or via some other means. To verify whether a received object meets trust criteria certified by the certificate, the end user simply computes the digest of the object and compares it with the corresponding digest in the certificate, and examines the type and safety checking flag of the object contained in the certificate. The end user can dynamically download additional objects, check their trustworthiness without having to verify the certificate multiple times.

DETAILED DESCRIPTION OF THE INVENTION

Figure 1:
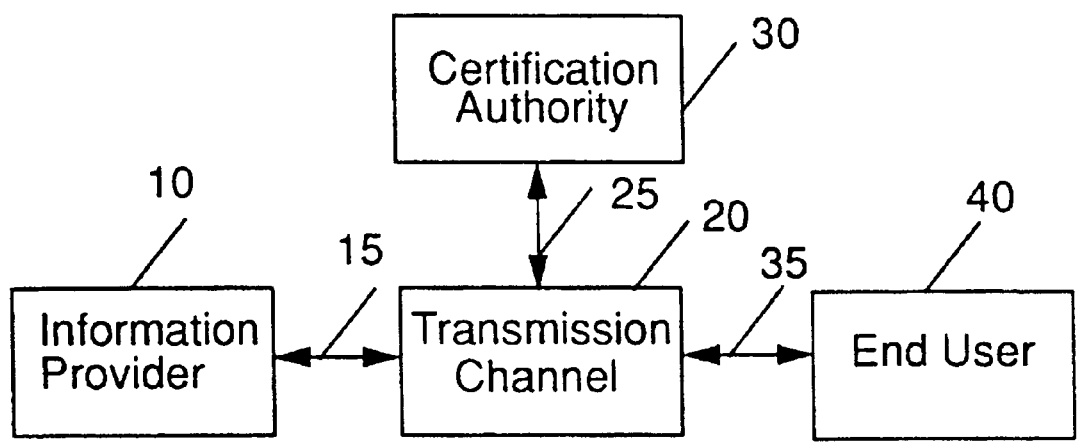
FIG. 1 is a model of digital objects certification and dissemination.

A method for trusted and dynamic dissemination of digital objects, or objects for short, is described. In the following description, numerous specific details are set forth such as logical structures of digital information and program steps, etc. in order to provide a thorough understanding of the present invention. It will be obvious to one skilled in the art that the present invention may be practised without these specific details. In other instances, well known steps as those involved in generation of public key and private key, generation and verification of digital signatures, and computing digest of an object using a secure one-way hash function are left out to avoid obscuring the present invention.

The detailed description with respect to trusted and dynamic dissemination of digital objects is presented partially in terms of algorithm and symbolic representation upon operation on data bits within the computer memory. These algorithmic descriptions and representations are the means used by those skilled on the art of data processing to most effectively convey the substance of their work to others skilled in the art.

An algorithm is here, and generally, conceived to be a self-consistent sequence of steps leading to a desired result. These steps are those require physical manipulation of physical quantities. Usually, though not necessarily, these quantities take the form of electrical or magnetic signals capable of being stored, transferred, combined, and otherwise manipulated. In this case, the physical quantities are voltage or current signals which correspond to the digital objects/information being distributed. It proves convenient at times, principally for reason of common usage, to refer to these signals as bits, values, elements, symbols, characters, terms, fields, numbers or the like. It should be borne in mind, however, that all of these and similar terms are to be associated with the appropriate physical quantities and are merely convenient labels applied to these quantities.

Furthermore, the manipulations performed are often referred to in terms such as adding or comparing, which are commonly associated with the mental operations performed by a human operator. No such capability of a human operator is necessary, or desirable. In most cases, in any of the operations described herein which form part of the present invention, the operations are machine operations. Useful machines for performing the operations of the present invention include general purpose digital computers or similar devices such as digital signal processors. In all cases, it should be borne in mind that there is a distinction between the method operation in operating a computer or other apparatus and the method of computation itself.

The present invention relates to methods for trusted and dynamic distribution of digital objects/information. These methods will be described in specific steps of manipulating information. For one skilled in the art, it should be obvious that some of these steps shall be best automated by, for example, implementing them as a special purpose software, which is usually called a server, running on general purpose computers. It should be clear that an information provider could simultaneously instantiate multiple executions of the server to serve multiple end users. It should also be clear that there may exist multiple certification authorities. For example, there may be one certification authority per organization.

The present invention also relates to an apparatus for performing these operations. This apparatus may be specially constructed for the required purpose or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct specialized apparatus such as digital signal processor to perform the required method steps. The required structure for a variety of these machines would appear from the description given below.

A general model for the trusted distribution scheme of digital objects is shown in FIG. 1. Here the information provider 10 refers to a supplier of objects to the end user 40. A digital object has an identifier and is a self-contained entity. There can be various types of objects including, but not restricted to, text, graphics, animation, video, audio, software, or any combination thereof. The transmission channel 20 represents the means and more specifically the media through which communication messages are exchanged among the information provider 10, the certification authority 30, and the end user 40. Such messages include certificate request from the information provider 10 to the certification authority 30 and certificate from the certification authority 30 to the information provider 10 over paths 15 and 25, and object request from the end user 40 to the information provider 10 and requested objects from the information provider 10 to the end user 40 over paths 15 and 35. The transmission channel 20 includes but is not limited to any communications means or media such as computer networks, radio links, satellite links, diskettes or other storage medium.

For clarity of presentation, the description below will elaborate on a model having one information provider, one certification authority, and one end user. However, it should be understood that multiple providers, certification authorities, and end users are possible, and, in most instances, would be the likely scenario. It should also be understood that the end user may be in the role of information provider with respect to other users.

The preferred embodiment of the present invention utilizes the public-key digital signature scheme to authenticate the integrity of the digital objects and the information provider. But it should be understood by those skilled in the art that the computational efficiency achieved by the present invention is not limited only to those systems of digital object dissemination which are based on public-key digital signature scheme. However, as a way of fully disclosing the way to make and use the preferred embodiment of the present invention, the public-key digital signature scheme, which is well known to those skilled in the art, and its role in the present invention will be discussed in detail.

The information provider 10 referred to in FIG. 1 groups digital objects into distribution packages based on their usage or functionality. The end user 40 may desire to access any individual object or any subset of objects in a package at different times. However, the end user may not trust the information provider in providing trusted objects. The end user may also not trust the path 15, the transmission channel 20, and path 35 to reliably deliver objects. A trusted object is an object which meets certain pre-defined trust criteria including authenticity of object originality and integrity, and guarantee of safety (such as virus-free guarantee) in using the object. The certification authority 30 is responsible for certifying objects meeting the pre-defined trust criteria. It is assumed that the end user trusts the certification authority in making correct statements about the objects it certifies.

Prior to the distribution of any digital objects, the information provider registers itself to the certification authority. During this registration process, the information provider authenticates itself to the certification authority by whatever means as required by the certification authority. The information provider agrees to the terms of a certification service contract. Such a contract contains at a minimum the identities, addresses of both the information provider and the certification authority, and the kind of safety checking (such as virus detection and network worm detection) to be performed by the certification authority on each type of objects. It may also contain the public keys of the information provider and the certification authority, respectively. These keys are selected by the respective party based on a certain public-key digital signature system (PKDSS).

A party, say X, in a PKDSS has a private key XSK and a public key XPK, where the private key is kept secret to party X only and the public key can be made known to everyone like a telephone number in telephone directory. A PKDSS has the property that, given knowledge of the public key, it is not feasible to determine the corresponding private key. The private key XSK is used by X to generate a digital signature, or signature for short, on a digital message. Such a digital signature on digital message serves more or less the same purpose as that of a hand written signature on paper document does. Let M_Sg=S(XSK, HM) denote X's signature on a message M, where S(.,.) is the signature generating function with XSK and HM as its inputs, HM is the digest of M which is normally the output of a secure one-way hash function h(.) with M as the input. To verify party X's signature M_Sg on a message M, both the signature and possibly the message must be made available to the verifying party.

Upon receiving M_Sg and possibly M, any party with knowledge of X's public key XPK can verify X's signature M_Sg on the message M. The party first computes HM'=V(XPK, M_Sg), where V(.,.) is the signature verification function with XPK and M_Sg as its inputs. The party then computes digest HM" of the received M based on h(.). If M_Sg is indeed X's signature on M and if the signature and the message were not modified in transmit, then HM'=HM" (since they both equal to HM). In this case, the signature M_Sg on M is verified; otherwise, it is not verified. In the former case, the party is certain that the message M came from X—authentication of the message originality, and that the message M and the signature M_Sg were not modified during transmission—authentication of message integrity. In the present invention, the information provider has a private key IPSK kept secret to itself and a corresponding public key IPPK made available to the certification authority.

Similarly, the certification authority has a public key CAPK made available to everyone and a private key CASK kept secret to itself. For further references on PKDSS and secure one-way hash functions, see D. E. R. Denning, Cryptography and Data Security, Addition-Wesley, Reading, Mass., 1983. Also see W. Stallings, Network and Internetworks Security—Principles and Practice, Prentice Halls Englewood Cliffs, N.J., 1995.

The certification authority must publish its public key CAPK and its certification services to all end users in an authentic manner. Certification services include types of objects it certifies, and what kind of safety checking it performs on each type of objects.

Figure 2:
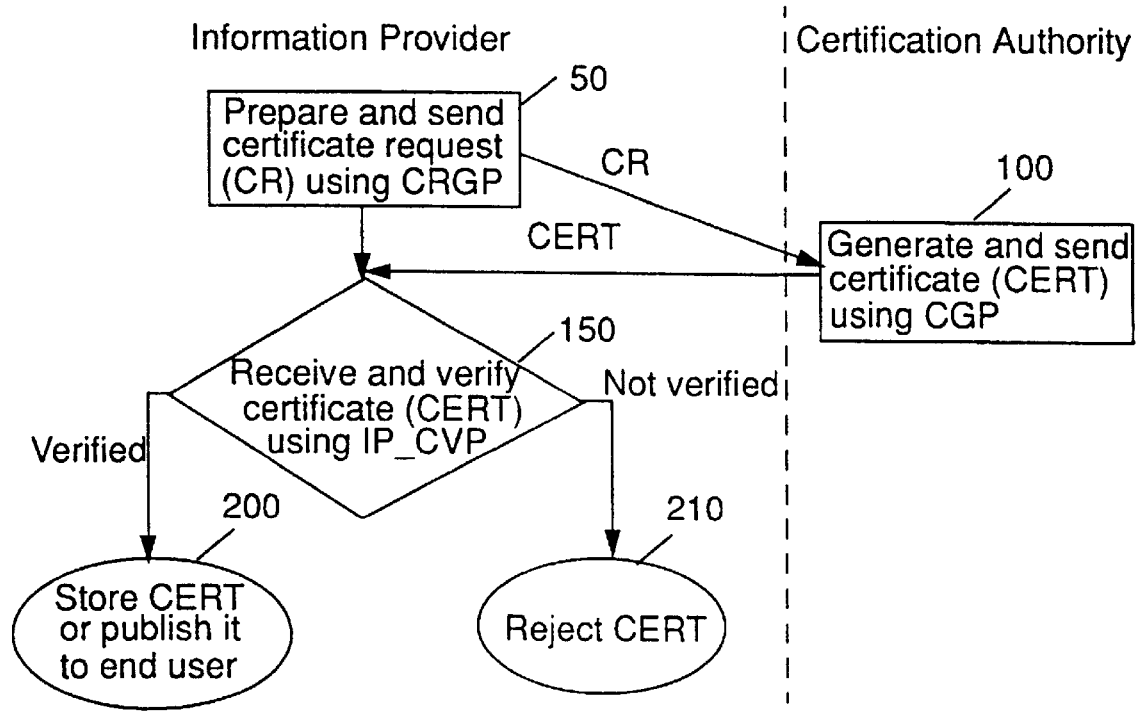
FIG. 2 shows the steps an information provider requests and obtains a certificate of a distribution package from a certification authority.
Figure 8:
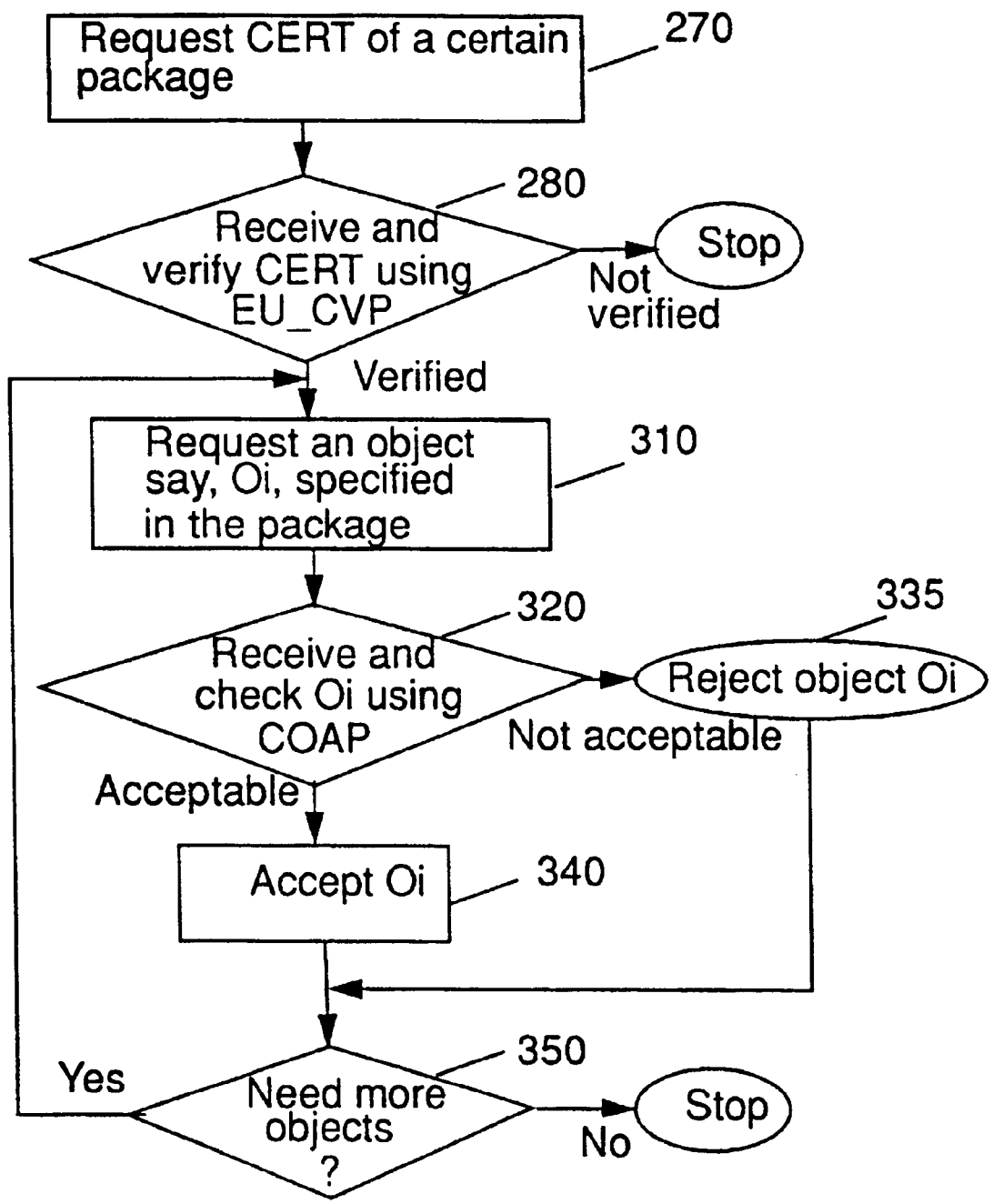
FIG. 8 shows the steps an end user verifies the certificate of a distribution package and accesses objects specified in the package dynamically in accordance to preferred embodiment of the present invention.
Figure 9:
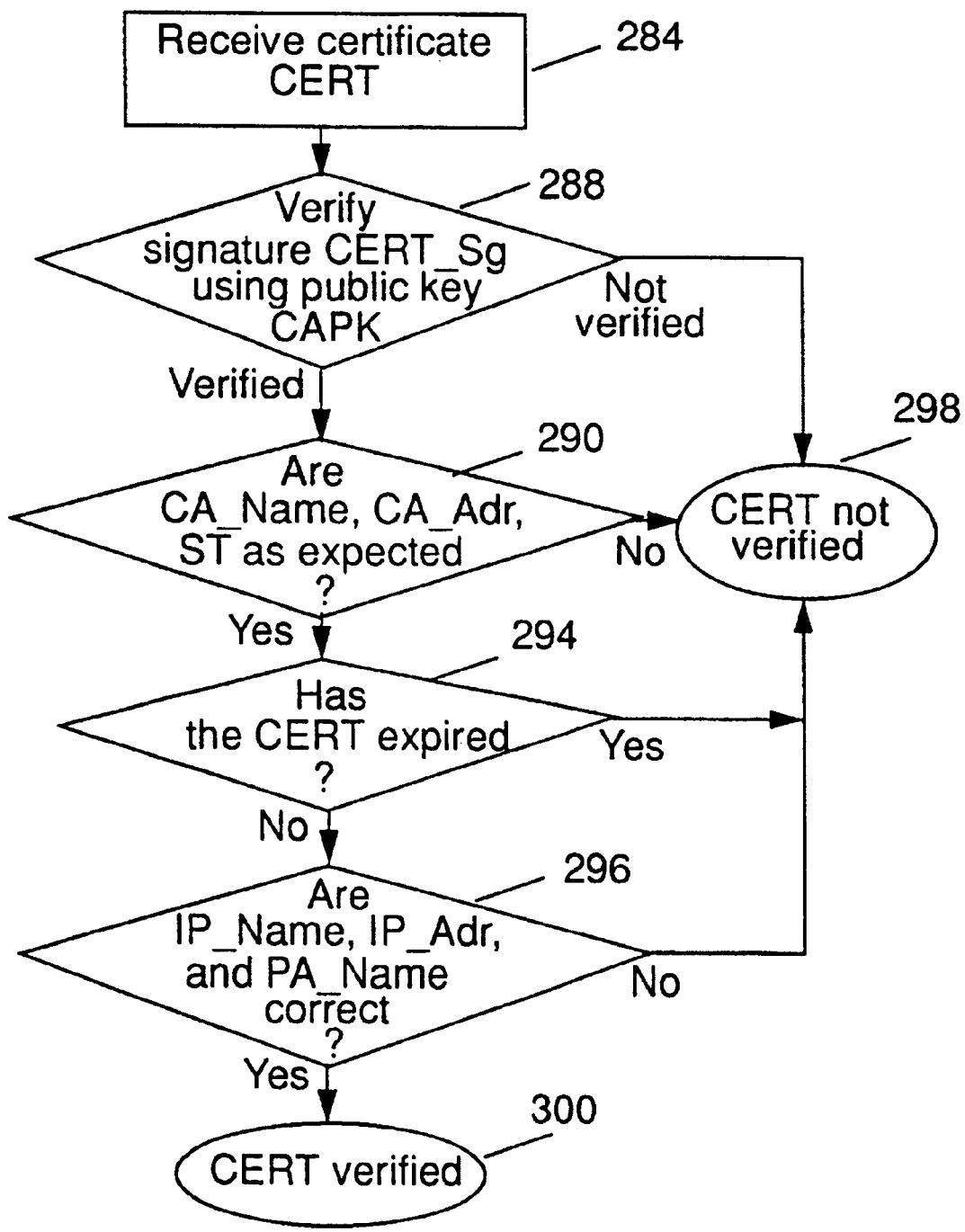
FIG. 9 illustrates the flow diagram of an end user certificate verification program (EU_CVP) used in the preferred embodiment of the present invention.
Figure 10:
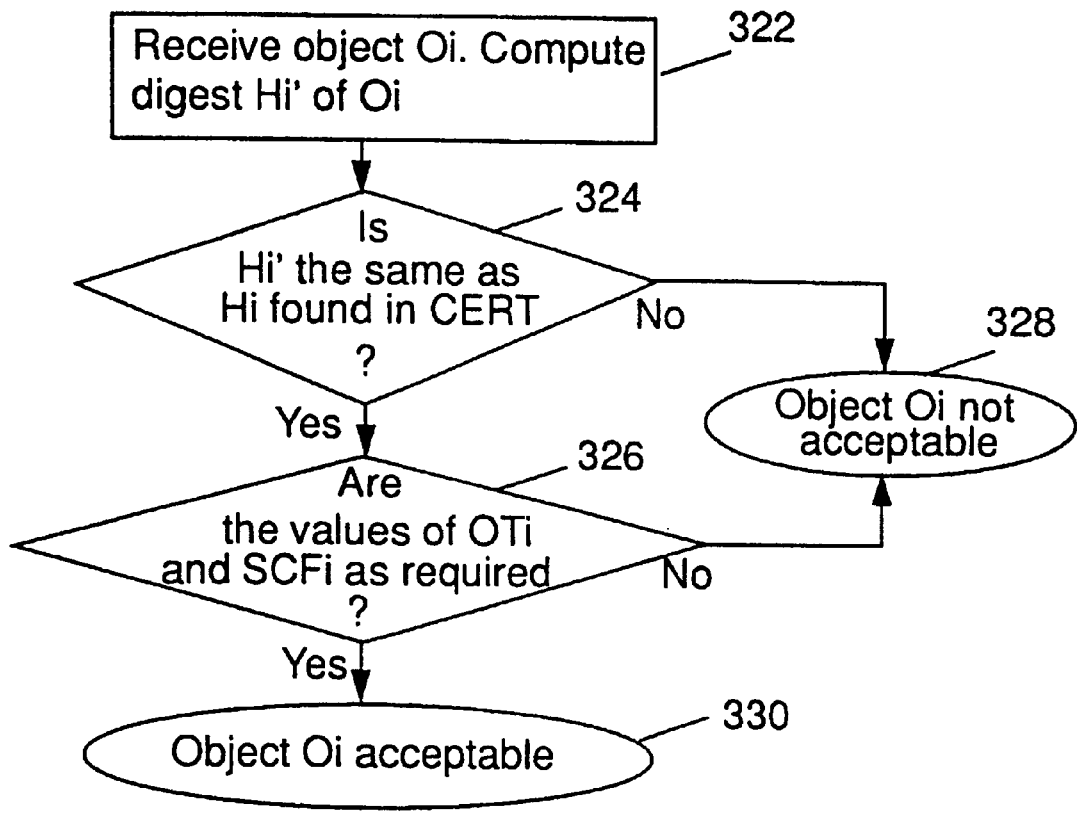
FIG. 10 illustrates the flow diagram of a checking object acceptability program (COAP) used in the preferred embodiment of the present invention.

FIG. 2 is a block diagram generally illustrating the steps in which the information provider requests and obtains a certificate of a certain distribution package of digital objects after the information provider has registered itself with the certification authority. FIGS. 3 through 7 describe in detail the process used in each of the steps generally described in FIG. 2. FIGS. 8–10 describe a process by which the users verify the integrity of the received data using the certificate received from the information provider.

In FIG. 2, the information provider prepares a certificate request (CR) message for a given distribution package and send the CR to the certification authority in step 50. The CR generated from CRGP in step 50 is sent to the certification authority. Upon receiving the CR, the certification authority generates a certificate (CERT) using a certificate generating program (CGP) in step 100. The CERT generated by CGP in step 100 is received and verified by the information provider using an information provider certificate verification program (IP_CVP) in step 150. The outcome of the IP_CVP in step 150 can be either "Not verified" or "Verified". In the former case, the received CERT is rejected; while in the latter case, the CERT is stored in a database (possibly together with the package it certifies) or published to end users.

Figure 3:
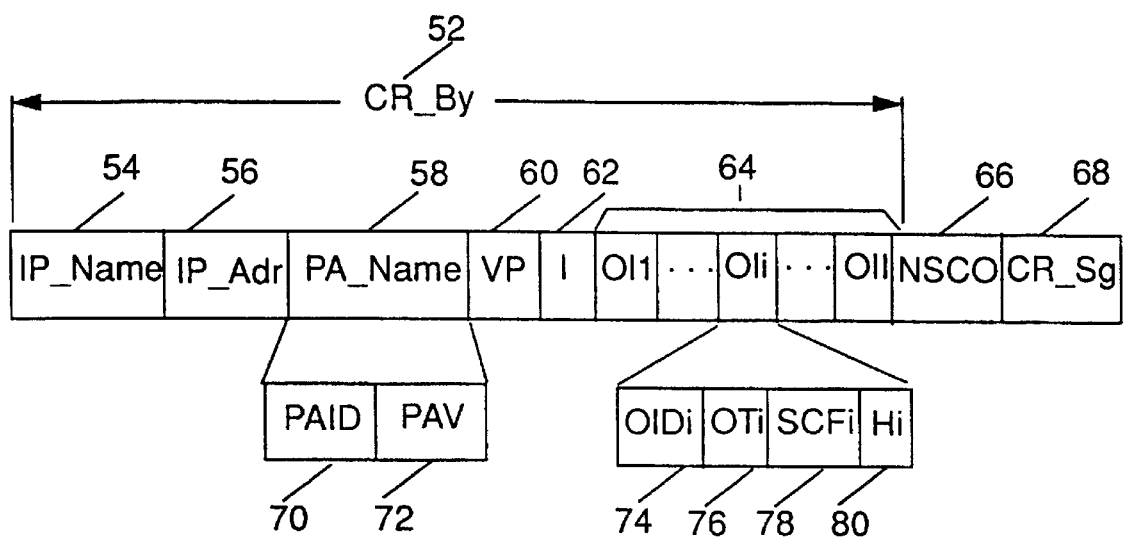
FIG. 3 illustrates a possible logical structure of a certification request (CR) according to the preferred embodiment of the present invention.

FIG. 3 illustrates the logical structure of CR which is prepared in step 50 of FIG. 2. The logical structure of the CR comprises a CR body (CR_By) 52, an optional need-safety-checking-objects field (NSCO) 66, and the information provider's signature (CR_Sg) 68 on CR_By and NSCO under the private key IPSK. The CR_By further comprises a plurality of fields: name of the information provider (IP_Name) 54, the postal/network address of the information provider (IP_Adr) 56, the name of the package (PA_Name) 58 to be certified, the desired validity period (VP) 60 of the requested certificate, the number of objects (I) 62 contained in the package in question, and the set of I object information (OI1, OI2, . . . , OIi, . . . , OII) 64. The PA_Name 58 further comprises a package identifier (PAID) 70, used to uniquely identify the package within the domain of the information provider, and a package version number (PAV) 72. The VP 60 refers to a specified time period within which the requested certificate is valid. The OIi in 64 relates to the ith object (Oi) and consists of the identifier (OIDi) 74, type (OTi) 76, safety checking flag (SCFi) 78, and digest (Hi) 80 of Oi. The OIDi 74 uniquely identifies Oi within the package, the OTi 76 is the type Oi belongs to, the SCFi 78 is a Boolean variable taking value either "ON" or "OFF", and the Hi 80 is the digest of Oi.

The SCFi="ON" indicates that safety of object Oi need be checked by the certification authority. Safety checking normally applies to software objects only. The specific kind of safety checking (such as virus detection) depends on the type of the object in question. If SCFi="OFF", then no safety check is requested by the information provider on object Oi. The digest Hi is computed as the output of a pre-defined secure one-way hash function with the object Oi as its input. The NSCO 66 contains all those objects whose safety flags take the value "ON".

Figure 4:
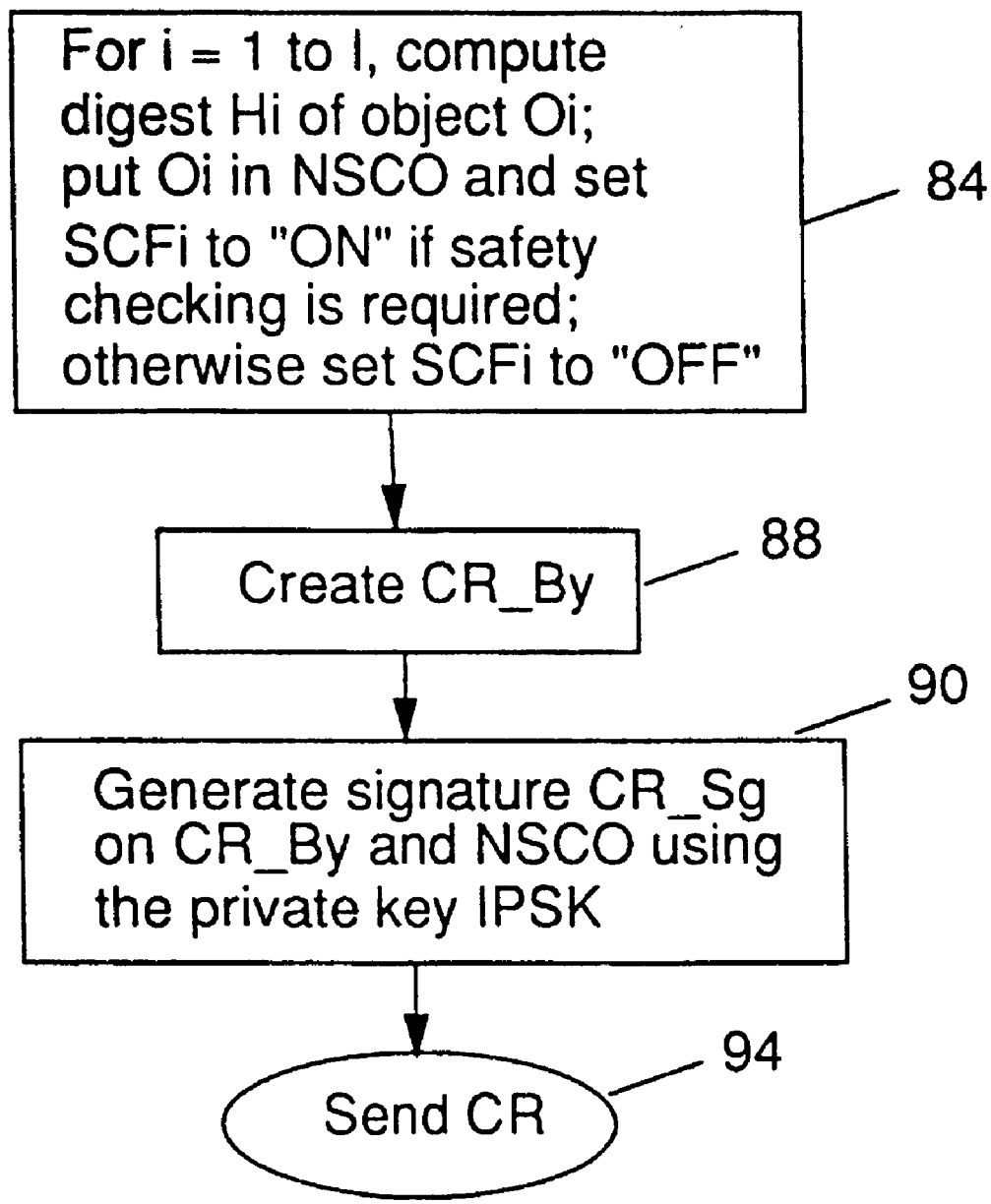
FIG. 4 shows the flow diagram of a certification request generating program (CRGP) used in the preferred embodiment of the present invention.

FIG. 4 is the flow diagram of a certificate request generating program (CRGP) used in step 50 of FIG. 2 to prepare and send the certificate request (CR) by the information provider. In step 84, for all object indexes i from 1 to I, the digest of object Oi is generated, and Oi is included in the NSCO 66 and SCFi is set to "ON" if safety checking on Oi is required: otherwise SCFi is set to "OFF". Next, the CR_By 52 is created in step 88 by concatenating the IP_Name 54, IP_Adr 56, PA_Name 58, VP 60, I 62 and 64. The information provider's signature CR_Sg 68 on CR_By 52 and NSCO 66 is computed under the private key IPSK in step 90. The completed CR is sent to the certification authority 30 in step 94.

Figure 5:
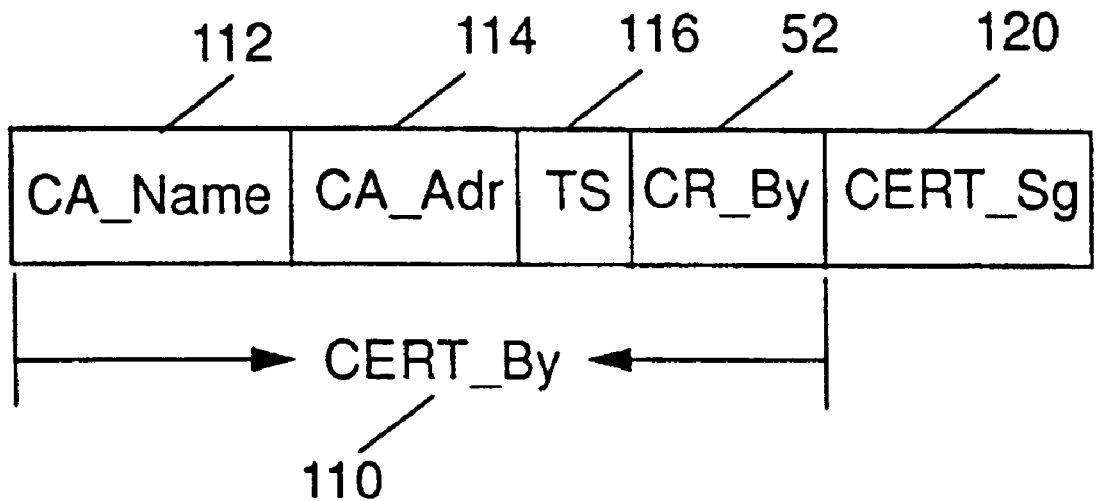
FIG. 5 illustrates a possible logical structure of a certificate (CERT) issued by a certification authority in accordance to the preferred embodiment of the present invention.

FIG. 5 shows a logical structure of CERT which is generated in step 100 of FIG. 2. It consists of a certificate body (CERT_By) 110 and the certification authority's signature (CERT_Sg) 120 on CERT_By under the private key CASK. The CERT_By 110 further comprises the name (CA_Name) 112 and the address (CA_Adr) 114 of the certification authority, a time-stamp (TS) 116, and the CR_By 52 which is copied exactly from the received CR. The TS 116 is the time and date the certificate is issued.

Figure 6:
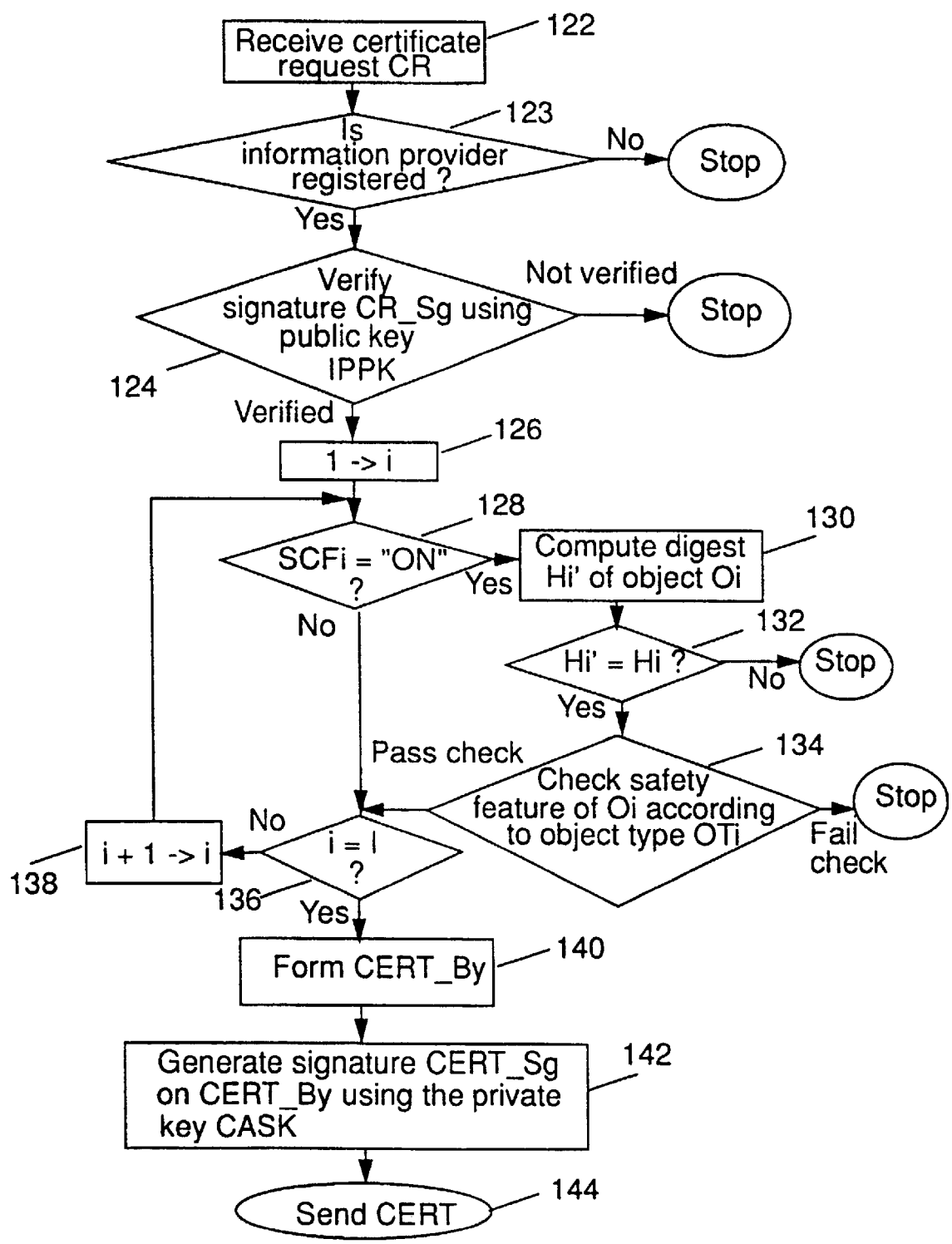
FIG. 6 shows the flow diagram of a certificate generating program (CGP) used in the preferred embodiment of the present invention.

FIG. 6 is a flow diagram illustrating the steps of a certificate generating program (CGP) used by the certification authority 30 to verify the incoming CR and to generate the CERT in step 100 of FIG. 2. The certificate request CR produced in step 50 in FIG. 2 is received in step 122. The CGP checks to see if the party named by IP_Name is a registered information provider in step 123. If it is not registered, the program terminates; otherwise, the program fetches the public key IPPK from the information provider's registration record and then verifies the signature CR_Sg using IPPK in step 124. If the signature is not verified, the CGP stops and appropriate actions are taken by the certification authority. A detailed description of those actions is beyond the scope of the present invention, however.

In general though, there are two possibilities for an invalid signature: (1) the message and the signature were modified either intentionally or otherwise during transit, or (2) the signature is generated under a key other than IPSK. Both outcomes are detected by the CGP in step 124. Assuming that the signature CR_Sg is verified in step 124, the object index i is set to 1 in step 126, the value of SCFi is read from the received CR and it is checked to see that whether the value of SCFi is "ON". If it is "ON", the CGP reads object Oi from the NSCO part of the received CR, computes its digest Hi' in step 130, and compares the newly computed digest with the digest Hi read from CR in step 132. If the two do not match, the program terminates. The mismatch occurs when the Hi supplied by the information provider is not the digest of Oi. This may happen when the information provider either intentionally or by mistake sends the wrong information.

Assuming now that Hi' matches Hi, the CGP checks the safety feature of Oi according to the object type OTi in step 134. If the object fails the check, the program stops. If Oi passes the safety checking or if the outcome in step 128 is "No", the present invention compares the current object index i with the total number of objects I in step 136. If i is less than I, i is increased by 1 in step 138 and the program goes back to step 128. Assuming that i=I, then the present invention forms the certificate body CERT_By 110 in step 140 by concatenating the CA_Name 112, CA_Adr 114, TS 116, and CR_By 52, where CR_By is copied from the received CR. The certification authority's signature CERT_Sg on CERT_By is generated under the private key CASK in step 142. The completed CERT is then sent to the information provider in step 144.

Figure 7:
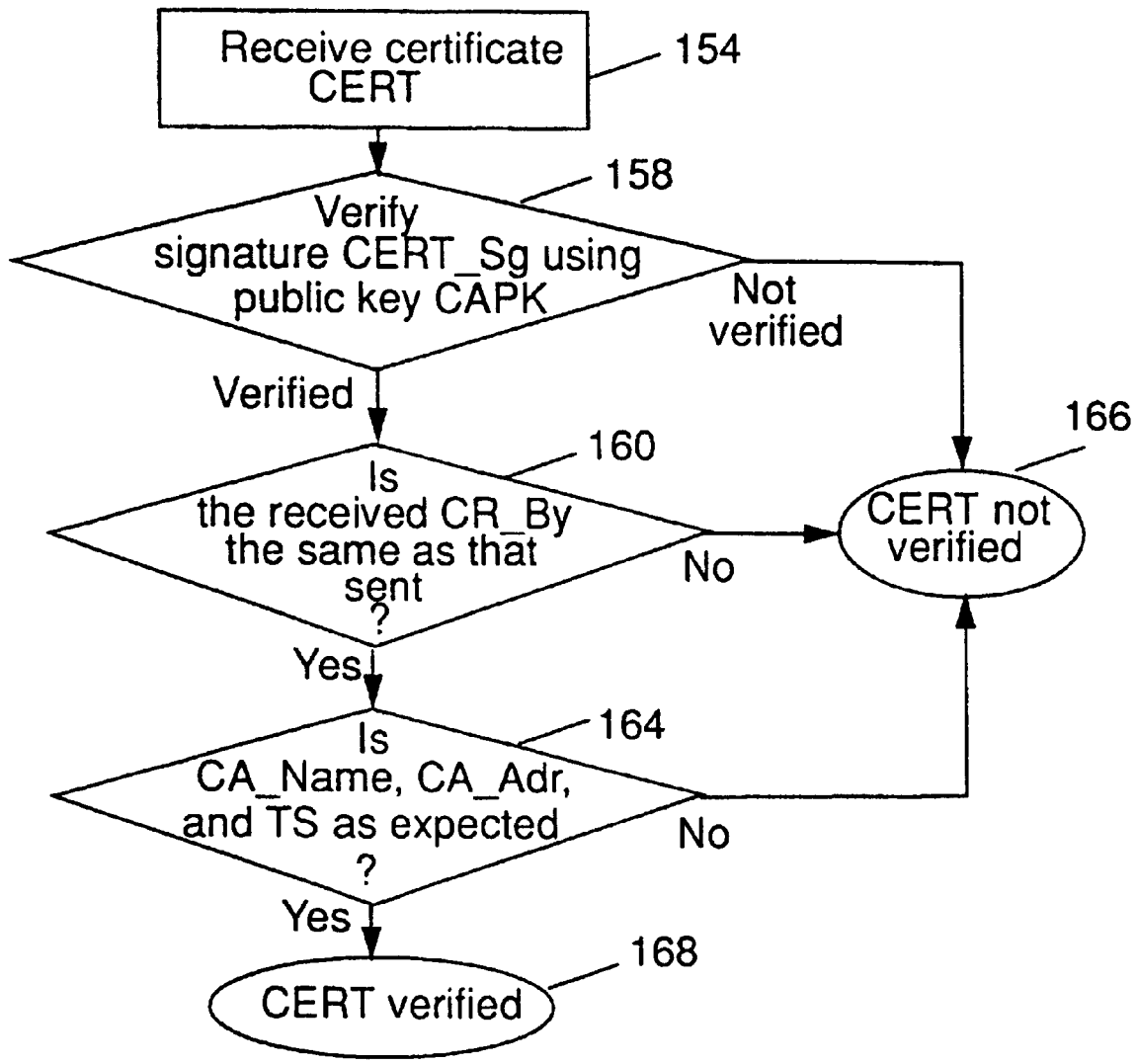
FIG. 7 illustrates the flow diagram of an information provider certificate verification program (IP_CVP) used in the preferred embodiment of the present invention.

FIG. 7 illustrates a flow diagram of the information provider certificate verification program (IP_CVP) used by the information provider in step 150 of FIG. 2. The certificate CERT is first received in step 154. The signature CERT_Sg is read from the received CERT and verified in step 158 using the certification authority's public key CAPK. Next, the CR_By is read from CERT and compared with the CR_By in CR sent by the information provider in step 50. Then the CA_Name, CA_Adr, and TS are read from CERT and checked to see if they are as expected. If the outcome in step 158 is "Not verified" or if the outcome in either steps 160 or 164 is "No", then a condition of "CERT not verified" is indicated in step 166. Only when the received CERT passes all the checks, then a condition of "CERT verified" is indicated in step 168.

FIGS. 8–10 illustrate the manner in which the end user accesses and verifies the certificate (CERT) prepared as described above, as well as the manner in which the end user accesses and evaluates digital objects contained in the certified package. In FIG. 8, the end user requests the CERT of a distribution package in step 270. The CERT is received and verified in step 280 using the end user certificate verification program (EU_CVP). If the outcome of step 280 is CERT "Not verified", the end user terminates its program. On the other hand, if the outcome of step 280 is CERT "Verified", the end user requests an object, say the ith object Oi, specified in the package in question from the information provider in step 310. The object is then received and checked for acceptability using a simple checking object acceptability program (COAP) in step 320. If the outcome of COAP in step 320 is object Oi "not acceptable" then the object is rejected in step 335; otherwise, the object is accepted in step 340. In either case, the present invention checks in step 350 to see if more objects are needed from the distribution package. If more objects are needed, the present invention repeats the steps described above starting from step 310; otherwise, the program terminates.

FIG. 9 shows a flow diagram of the end user certificate verification program (EU_CVP) used in step 280 of FIG. 8 to verify the CERT. In step 284, the EU_CVP receives CERT from the information provider. The EU_CVP then verifies the signature CERT_Sg in the CERT using the certification authority's public key CAPK. If the signature is not verified, a condition of "CERT not verified" is indicated in step 298. Assuming that the signature is verified, the EU_CVP in step 290 reads CA_Name, CA_Adr, and ST to see if they are as expected. If the outcome is "No", the condition that "CERT not verified" is raised in step 298; otherwise, the EU_CVP reads and checks the validity period VP of the CERT in step 294. If the CERT is not expired, the EU_CVP reads and checks the correctness of IP_Name, IP_Adr, and PA_Name in the CERT. If the answer is "Yes", the EU_CVP decides that the CERT is verified in step 300. If the outcome in step 294 is "Yes" or the outcome in step 296 is "No", the EU_CVP raises the condition of "CERT not verified" in step 298.

FIG. 10 illustrates the flow diagram of the checking object acceptability program (COAP) used in step 320 of FIG. 8. The COAP computes the digest Hi' of the received object Oi in step 322. The outcome of step 322 is used as input to step 324 where the newly computed digest Hi' is compared with the digest Hi found in the CERT. If there is no match, the object Oi is labeled as "not acceptable" in step 328. If there is a match, however, the COAP fetches the values of OTi and SCFi from the CERT and checks them to see if they are as required in step 326. If the answer is "Yes", the object is labeled as "acceptable" in step 330; otherwise, the object is marked as "not acceptable" in step 328.

It should be understood by those skilled in the art that the above method is presented here as a way of illustrating the preferred method of making and using the invention, and should not be construed as being the only way. Hence, various modifications, additions and substitutions are possible for the invention described herein, without departing from the scope and spirit of the invention as disclosed in the accompanying claims.

We claim:

1. In a system for dissemination of digital objects over a transmission channel, said system including at least one information provider, end user, and trusted third party, a method for providing trusted and dynamic dissemination of digital objects comprising the steps of:

a) registering the information provider with said trusted third party prior to distribution of any digital objects;

b) grouping digital objects into distribution packages by the information provider;

c) providing a certificate request by the information provider to the trusted third party, said certificate request including a certificate request body and a field for verifying integrity of contents of said body, said body including information provider identification fields for providing information to uniquely identify the information provider, package identifying field for uniquely identifying a distribution package, object information fields for uniquely identifying each of a plurality of digital objects in the distribution package, said information fields including a digest of each of said digital objects, said digest being computed as an output of a predetermined secure one-way hash function with said object as its input;

d) verifying said certificate request by the trusted third party using predetermined criteria;

e) providing a certificate to the information provider by the trusted third party if the predetermined criteria in step d) are met, said certificate including a certificate body and a field for verifying integrity of contents of said body, said body including a trusted third party's identification field for uniquely identifying the trusted third party, a time stamp indicating issue date, and said certificate request body;

f) rejecting the certificate request if the predetermined criteria of step d) are not met;

g) verifying said certificate from step e) by the information provider using predetermined criteria;

h) storing said certificate if said predetermined criteria in step g) are met;

i) rejecting said certificate if said predetermined criteria in step g) are not met;

j) accessing said certificate from step h) by an end user before accessing any of said digital objects;

k) verifying said certificate by the end user using predetermined criteria;

l) rejecting said certificate if said predetermined criteria in step k) are not met;

m) accessing a digital object from the distribution package if the predetermined criteria in step k) are met;

n) computing a digest as an output of said predetermined secure one-way hash function with said accessed digital object from step m) as input;

o) comparing said digest from step n) with the digest of the digital object from the object information fields in the certificate;

p) rejecting said digital object if the compared digests in step o) are not identical; and q) accepting said digital object if the compared digests in step o) are identical;

whereby said trusted third party can authenticate all digital objects in the distribution package and issue a single certificate certifying all of said digital objects, and said end user can verify trustworthiness of each of said digital objects in the single certificate and access any of the digital objects in the distribution package at user's discretion.

2. The method as recited in claims 1 wherein said distribution packages are grouped based on their usage and functionality.

3. The method as recited in claim 1 wherein said certificate request further includes a field for validity period of the requested certificate to be issued by a trusted third party.

4. The method as recited in claim 1 wherein said information provider identification fields include the name of the information provider and the network address of the information provider.

5. In a system for dissemination of digital objects over a transmission channel, said system including at least one information provider, end user, and trusted third party, a computationally efficient method for providing trusted and dynamic dissemination of digital objects comprising the steps of:

a) registering the information provider with said trusted third party prior to distribution of any digital objects using a public key digital signature scheme, said scheme including an information provider's public key and private key, said public key being made known to the trusted third party in an authenticated manner and said private key being secretly known only to said information provider, said private key being used by the information provider to generate a digital signature, said public key being used to verify said digital signature by the trusted third party;

b) grouping digital objects into distribution packages by the information provider;

c) providing a certificate request by the information provider to the trusted third party, said certificate request including a certificate request body and a digital signature on said certificate request body under said information provider's private key based on the public key digital signature scheme, said certificate request body including said information provider's identification fields for uniquely identifying the information provider, package identification fields for uniquely identifying a distribution package, object information fields for uniquely identifying each of a plurality of digital objects in the distribution package, said object information fields including a digest of each of said digital objects, said digest being computed as the output of a predetermined secure one-way hash function with said object as its input;

d) verifying said certificate request by the trusted third party using predetermined criteria;

e) providing a certificate to the information provider by the trusted third party if the predetermined criteria in step d) are met, said certificate comprising a certificate body and a digital signature on the said certificate body under the trusted third party's private key based on a predetermined public key digital signature scheme, said certificate body including the trusted third party's identification fields for uniquely identifying the trusted third party, a time stamp indicating issue date, and said certificate request body;

f) rejecting the certificate request if the predetermined criteria of step d) are not met;

g) verifying said certificate from step e) by the information provider using predetermined criteria;

h) storing said certificate if said predetermined criteria in step g) are met;

i) rejecting said certificate if said predetermined criteria in step g) are not met;

j) accessing said certificate from step h) by an end user before accessing any of said digital objects;

k) verifying said certificate by the end user using predetermined criteria;

l) rejecting said certificate if said predetermined criteria in step k) are not met;

m) accessing a digital object from the distribution package if the predetermined criteria in step k) are met;

n) computing a digest as output of said predetermined secure one-way hash function with said accessed digital object from step m) as input;

o) comparing said digest from step n) with the digest of the digital object from the object information fields in the certificate;

p) rejecting said digital object if the two digests in step o) are not identical; and q) accepting said digital object if the two digests in step o) are identical;

whereby said trusted third party can authenticate all digital objects in the distribution package and issue a single certificate certifying all of said digital objects, and said end user can verify the trustworthiness of each of said digital objects in the single certificate and access any of the digital objects in the distribution package at user's discretion.

6. The method as defined in claim 5, wherein said verification of a certificate request by the trusted third party comprising the steps of:

a) verifying that identity of the information provider contained in said certificate request corresponds to a registered information provider and that said information provider's public key is still valid; and b) verifying said information provider's signature contained in said certificate request using the information provider's public key.

7. The method as recited in claim 5, wherein said verification of a certificate by the information provider in step g) comprising the steps of:

a) verifying the identities of the information provider and the trusted third party contained in said certificate;

b) verifying that the validity period has not elapsed; and c) verifying said trusted third party's signature contained in said certificate using said trusted third party's public key.

8. The method as recited in claim 5, wherein said verification of a certificate by the end user in step k) comprising the steps of:

a) verifying the identities of the information provider and the trusted third party contained in said certificate;

b) verifying that the validity period has not elapsed; and c) verifying said trusted third party's signature contained in said certificate using said trusted third party's public key.

9. In a system for dissemination of digital objects over a transmission channel, said system including at least one information provider, end user, and trusted third party, a computationally efficient method for providing trusted and dynamic dissemination of digital objects comprising the steps of:

a) registering the information provider with said trusted third party prior to distribution of any digital objects using a public key digital signature scheme, said scheme including an information provider's public key and private key, said public key being made known to the trusted third party in an authenticated manner and said private key being secretly known only to said information provider, said private key being used by the information provider to generate a digital signature, said public key being used to verify said digital signature by the trusted third party;

b) grouping digital objects into distribution packages by the information provider;

c) providing a certificate request by the information provider to the trusted third party, said certificate request including a certificate request body and a digital signature on the said certificate request body under said information provider's private key based on the public key digital signature scheme, said certificate request body including said information provider's identification fields for uniquely identifying the information provider, package identification fields for uniquely identifying a distribution package, object information fields for uniquely identifying each of a plurality of digital objects in the distribution package, said object information fields including a digest of each of said digital objects, said digest being computed as the output of a predetermined secure one-way hash function with said object as its input;

d) verifying said certificate request by the trusted third party by verifying that the identity of information provider contained in said certificate-request corresponds to a registered information provider, that said information provider's public key is still valid, and verifying said information provider's signature contained in said certificate request using the information provider's public key;

e) providing a certificate to the information provider by the trusted third party if the verifying step d) is passed, said certificate comprising a certificate body and a digital signature on the said certificate body under the trusted third party's private key based on a predetermined public key digital signature scheme, said certificate body including the trusted third party's identification fields for uniquely identifying the trusted third party, a time stamp indicating issue date, and said certificate request body;

f) rejecting the certificate request if the verifying step d) is not passed;

g) verifying said certificate from step e) by the information provider by verifying the identities of the information provider and the trusted third party contained in said certificate, verifying that the validity period has not elapsed, and verifying said trusted third party's signature contained in said certificate using said trusted third party's public key;

h) storing said certificate if the verifying step g) is passed;

i) rejecting said certificate if the verifying step g) is not passed;

j) accessing said certificate from step h) by an end user before accessing any of said digital objects;

k) verifying said certificate by the end user by verifying the identities of the information provider and the trusted third party contained in said certificate, verifying that the validity period has not elapsed, and verifying said trusted third party's signature contained in said certificate using said trusted third party's public key;

l) rejecting said certificate if the verifying step k) is not passed;

m) accessing a digital object from the distribution package if the verifying step k) is passed;

n) computing a digest as output of said predetermined secure one-way hash function with said accessed digital object from step m) as input;

o) comparing said digest from step n) with the digest of the digital object from the object information fields in the certificate;

p) rejecting said digital object if the two digests in step o) are not identical; and q) accepting said digital object if the two digests in step o) are identical;

whereby said trusted third party can authenticate all digital objects in the distribution package and issue a single certificate certifying all of said digital objects, and said end user can verify the trustworthiness of each of said digital objects in the single certificate and access any of the digital objects in the distribution package at user's discretion.

10. In a system for dissemination of digital objects over a transmission channel, said system including at least one information provider, end user, and trusted third party, a computationally efficient method for providing trusted and dynamic dissemination of digital objects comprising the steps of:

a) registering the information provider with said trusted third party prior to distribution of any digital objects using a public key digital signature scheme, said scheme including an information provider's public key and private key, said public key being made known to the trusted third party in an authenticated manner and said private key being secretly known only to said information provider, said private key being used by the information provider to generate digital signature, said public key being used to verify said digital signature by the trusted third party;

b) grouping digital objects into distribution packages by the information provider;

c) providing a certificate request by the information provider to the trusted third party, said certificate request including a certificate request body, an optional need-safety-checking objects field, and a digital signature on the certificate request body and the said need-safety-checking objects field under said information provider's private key based on the public key digital signature scheme, said certificate request body including said information provider's identification fields for uniquely identifying the information provider, package identification fields for uniquely identifying a distribution package, object information fields for uniquely identifying each of a plurality of digital objects in the distribution package, said object information fields including a digest, an object type indicator, and a safety-checking flag for each of said digital objects, said digest being computed as an output of a predetermined secure one-way hash function with said object as its input, said safety-checking flag taking two possible values corresponding to ON and OFF, said need-safety-checking objects field containing objects whose safety needs to be checked by the trusted third party;

d) verifying said certificate request by the trusted third party using predetermined criteria;

e) providing a certificate to the information provider by the trusted third party if the predetermined criteria in step d) are met, said certificate comprising a certificate body and a digital signature on the said certificate body under the trusted third party's private key based the predetermined public key digital signature scheme, said certificate body including the trusted third party's identification fields for uniquely identifying the trusted third party, a time stamp indicating issue date, and said certificate request body;

f) rejecting the certificate request if the predetermined criteria of step d) are not met;

g) verifying said certificate from step e) by the information provider using predetermined criteria;

h) storing said certificate if said predetermined criteria in step g) are met;

i) rejecting said certificate if said predetermined criteria in step g) are not met;

i) accessing said certificate from step h) by an end user before accessing any of said digital objects;

k) verifying said certificate by the end user using predetermined criteria;

l) rejecting said certificate if said predetermined criteria in step k) are not met;

m) accessing a digital object from the distribution package if the predetermined criteria in step k) are met;

n) computing a digest as output of said predetermined secure one-way hash function with said accessed digital object from step m) as input;

o) comparing said digest from step n) with the digest of the digital object from the object information fields contained in the certificate and checking if values of the object type indicator and safety-checking flag of said object are as required;

p) rejecting said digital object if the two digests in step o) are not identical or if the values of the object type indicator and safety-checking flag of said object are not as required; and q) accepting said digital object if the two digests in step o) are identical and if the values of the object type indicator and safety-checking flag of said object are as required;

whereby said trusted third party can authenticate all digital objects in the distribution package and issue a single certificate certifying all of said digital objects, and said end user can verify the trustworthiness of each of said digital objects in the single certificate and access any of the digital objects in the distribution package at user's discretion.

11. The method as defined in claim 10, wherein said verification of a certificate-request by the trusted third party comprising the steps of:

a) verifying that identity of information provider contained in said certificate-request corresponds to a registered information provider and that said information provider's public key is still valid; and b) verifying said information provider's signature contained in said certificate-request; and c) computing a digest as output of a predetermined secure one-way hash function with said digital object as input for each object contained in the need-safety-checking-objects field; and d) verifying that said digest from step c) is identical to the corresponding digest contained in the object information field; and e) verifying the safety features of said object with predetermined procedures.

12. The method as recited in claim 10, wherein said verification of a certificate by the information provider comprising the steps of:

a) checking the correctness of identities of information provider and trusted third party contained in said certificate; and b) verifying said trusted third party's signature contained in said certificate.

13. The method as recited in claim 10, wherein said verification of a certificate by the end user comprising the steps of:

a) checking the correctness of identities of information provider and trusted third party contained in said certificate; and b) verifying said trusted third party's signature contained in said certificate.

14. In a system for dissemination of digital objects over a transmission channel, said system including at least one information provider, end user, and trusted third party, a computationally efficient method for providing trusted and dynamic dissemination of digital objects comprising the steps of:

a) registering the information provider with said trusted third party prior to distribution of any digital objects;

b) grouping digital objects into distribution packages by the information provider;

c) providing a certificate request by the information provider to the trusted third party, said certificate request including a certificate request body and a field for verifying integrity of contents of said body, said body including information provider identification fields for providing information to uniquely identify the information provider, package identifying field for uniquely identifying a distribution package, object information fields for uniquely identifying each of a plurality of digital objects in the distribution package, said information fields including a digest of each of said digital objects, said digest being computed as an output of a predetermined secure one-way hash function with said object as its input;

d) verifying said certificate request by the trusted third party using predetermined criteria;

e) providing a certificate to the information provider by the trusted third party if the predetermined criteria in step d) are met, said certificate including a certificate body and a field for verifying integrity of contents of said body, said certificate body including a trusted third party's identification field for uniquely identifying the trusted third party, a time stamp indicating issue date, and said certificate request body;

f) rejecting the certificate request if the predetermined criteria of step d) are not met;

g) verifying said certificate from step e) by the information provider using predetermined criteria;

h) storing said certificate if said predetermined criteria in step g) are met; and i) rejecting said certificate if said predetermined criteria in step g) are not met;

whereby said trusted third party can authenticate all digital objects in the distribution package and issue a single certificate certifying all of said digital objects.

15. In a system for dissemination of digital objects over a transmission channel, said system including at least one information provider, end user, and trusted third party, a computationally efficient method for providing trusted and dynamic dissemination of digital objects comprising the steps of:

a) registering the information provider with said trusted third party prior to distribution of any digital objects using a public key digital signature scheme, said scheme including an information provider's public key and private key, said public key being made known to the trusted third party in an authenticated manner and said private key being secretly known only to said information provider, said private key being used by the information provider to generate a digital signature, said public key being used to verify said digital signature by the trusted third party;

b) grouping digital objects into distribution packages by the information provider;

c) providing a certificate request by the information provider to the trusted third party, said certificate request including a certificate request body and a digital signature on the said certificate request body under said information provider's private key based on the public key digital signature scheme, said certificate request body including said information provider's identification fields for uniquely identifying the information provider, package identification fields for uniquely identifying a distribution package, object information fields for uniquely identifying each of a plurality of digital objects in the distribution package, said object information fields including a digest of each of said digital objects, said digest being computed as the output of a predetermined secure one-way hash function with said object as its input;

d) verifying said certificate request by the trusted third party using predetermined criteria;

e) providing a certificate to the information provider by the trusted third party if the predetermined criteria in step d) are met, said certificate comprising a certificate body and a digital signature on the said certificate body under the trusted third party's private key based on a predetermined public key digital signature scheme, said certificate body including the trusted third party's identification fields for uniquely identifying the trusted third party, a time stamp indicating issue date, and said certificate request body;

f) rejecting the certificate request if the predetermined criteria of step d) are not met;

g) verifying said certificate from step e) by the information provider using predetermined criteria;

h) storing said certificate if said predetermined criteria in step g) are met;

i) rejecting said certificate if said predetermined criteria in step g) are not met;

whereby said trusted third party can authenticate all digital objects in the distribution package and issue a single certificate certifying all of said digital objects.

16. The method as defined in claim 15, wherein said verification of a certificate-request by the trusted third party comprising the steps of:

a) verifying that identity of the information provider contained in said certificate-request corresponds to a registered information provider and that said information provider's public key is still valid; and b) verifying said information provider's signature contained in said certificate request using the information provider's public key.

17. The method as recited in claim 15, wherein said verification of a certificate by the information provider in step g) comprising the steps of:

a) verifying the identity of the information provider and the trusted third party contained in said certificate;

b) verifying that the validity period has not elapsed; and c) verifying said trusted third party's signature contained in said certificate using said trusted third party's public key.

18. In a system for dissemination of digital objects over a transmission channel, said system including at least one information provider, end user, and trusted third party, where the information provider groups digital objects into distribution packages, and obtains a single certificate from the trusted third party for each of the distribution packages, said certificate containing information provider identification fields, package identifying field, object information fields including a digest of each of said digital objects, identity of a trusted third party, a time stamp indicating issue date, said trusted third party's digital signature on all of said fields, a computationally efficient method for providing trusted and dynamic access of digital objects by the end user comprising the steps of:

a) accessing said certificate from the information provider before accessing any of said digital objects;

b) verifying said certificate by the end user using predetermined criteria;

c) rejecting said certificate if said predetermined criteria in step b) are not met;

d) accessing a digital object from the distribution package if the predetermined criteria in step b) are met;

e) computing a digest as output of said predetermined secure one-way function with said accessed digital object from step d) as input;

f) comparing said digest from step e) with the digest of the digital object from the object information fields in the certificate;

g) rejecting said digital object if the compared digests in step f) are not identical; and h) accepting said digital object if the compared digests in step f) are identical;

whereby said end user can verify trustworthiness of each of said digital objects in the single certificate and access any of the digital objects in the distribution package at the user's discretion.

19. The method as recited in claim 18, wherein said verification of a certificate by the end user comprising the steps of:

a) checking the correctness of identities of information provider and trusted third party contained in said certificate; and b) verifying said trusted third party's signature contained in said certificate.

* * * * *